US010707988B2

(12) United States Patent
Salah et al.

(10) Patent No.: US 10,707,988 B2
(45) Date of Patent: Jul. 7, 2020

(54) TRANSPORT BLOCK SIZE DETERMINATION IN MOBILE COMMUNICATIONS

(71) Applicant: MediaTek Singapore Pte. Ltd., Singapore (SG)

(72) Inventors: Abdellatif Salah, Cambridge (GB); Abdelkader Medles, Cambridge (GB)

(73) Assignee: MediaTek Singapore Pte. Ltd, Singapore (SG)

(*) Notice: Subject to any disclaimer, the term of this patent is extended or adjusted under 35 U.S.C. 154(b) by 0 days.

(21) Appl. No.: 16/127,211

(22) Filed: Sep. 10, 2018

(65) Prior Publication Data

US 2019/0081729 A1    Mar. 14, 2019

Related U.S. Application Data

(60) Provisional application No. 62/566,814, filed on Oct. 2, 2017, provisional application No. 62/556,541, filed on Sep. 11, 2017.

(51) Int. Cl.
*H04W 4/00* (2018.01)
*H04L 1/00* (2006.01)
*H04L 5/00* (2006.01)

(52) U.S. Cl.
CPC .......... *H04L 1/0009* (2013.01); *H04L 1/0002* (2013.01); *H04L 1/0028* (2013.01); *H04L 5/0046* (2013.01); *H04L 5/0055* (2013.01); *H04L 5/0094* (2013.01)

(58) Field of Classification Search
CPC ........... H04W 72/042; H04W 72/0446; H04W 76/27; H04L 5/0048; H04L 5/0055
See application file for complete search history.

(56) References Cited

U.S. PATENT DOCUMENTS

| 8,239,590 | B1* | 8/2012 | Wennekamp .... H03K 19/17736 710/305 |
| 8,432,866 | B1 | 4/2013 | Tapaninen |
| 9,736,816 | B2 | 8/2017 | Pelletier et al. |
| 2003/0156652 | A1* | 8/2003 | Wise ..................... G06F 9/3867 375/240.26 |
| 2006/0015330 | A1* | 1/2006 | Kim ....................... G10L 19/12 704/219 |

(Continued)

FOREIGN PATENT DOCUMENTS

CN           102088732 A         6/2011

OTHER PUBLICATIONS

Taiwan Intellectual Property Office, Office Action for Taiwan Patent Application No. 107131946, dated Jun. 13, 2019.

(Continued)

*Primary Examiner* — Atique Ahmed
(74) *Attorney, Agent, or Firm* — Han IP PLLC; Andy M. Han

(57) ABSTRACT

Various solutions for transport block size (TBS) determination with respect to user equipment and network apparatus in mobile communications are described. An apparatus may determine an intermediate number of information bits. The apparatus may quantize the intermediate number of information bits. The apparatus may determine a TBS according to the quantized intermediate number of information bits. The apparatus may transmit the information bits according to the TBS.

16 Claims, 3 Drawing Sheets

(56) References Cited

U.S. PATENT DOCUMENTS

| | | | | |
|---|---|---|---|---|
| 2006/0268821 | A1* | 11/2006 | Terry | H04B 7/2606 |
| | | | | 370/349 |
| 2006/0279654 | A1* | 12/2006 | Lee | H04N 19/105 |
| | | | | 348/395.1 |
| 2008/0288850 | A1* | 11/2008 | Rhee | H04L 1/0066 |
| | | | | 714/781 |
| 2010/0153477 | A1 | 6/2010 | Chou | |
| 2012/0033767 | A1* | 2/2012 | Wilborn | H04L 25/03184 |
| | | | | 375/341 |
| 2012/0086586 | A1* | 4/2012 | Ma | H03M 7/30 |
| | | | | 341/87 |
| 2012/0300692 | A1* | 11/2012 | Sfar | H04B 7/15521 |
| | | | | 370/315 |
| 2015/0085735 | A1* | 3/2015 | Shelby | H04L 65/80 |
| | | | | 370/312 |
| 2015/0381209 | A1* | 12/2015 | Roh | H03M 13/09 |
| | | | | 714/755 |
| 2016/0183276 | A1* | 6/2016 | Marinier | H04W 72/02 |
| | | | | 370/329 |

OTHER PUBLICATIONS

State Intellectual Property Office of China, International Search Report and Written Opinion for International Patent Application No. PCT/CN2018/105097, dated Nov. 29, 2018.

Huawei et al., Discussion on TB size determination, 3GPP TSG RAN WG1 Meeting #90, Prague, Czech Republic, Aug. 21, 2017.

* cited by examiner

TRANSPORT BLOCK SIZE DETERMINATION IN MOBILE COMMUNICATIONS

CROSS REFERENCE TO RELATED PATENT APPLICATION(S)

The present disclosure is part of a non-provisional application that claims the priority benefit of U.S. Provisional Patent Application Nos. 62/556,541 and 62/566,814, filed on 11 Sep. 2017 and 2 Oct. 2017, respectively. Contents of above-listed applications are herein incorporated by reference in their entirety.

TECHNICAL FIELD

The present disclosure is generally related to mobile communications and, more particularly, to transport block size (TBS) determination with respect to user equipment and network apparatus in mobile communications.

BACKGROUND

Unless otherwise indicated herein, approaches described in this section are not prior art to the claims listed below and are not admitted as prior art by inclusion in this section.

In Long-Term Evolution (LTE), the TBS is determined based on the physical resource block (PRB) allocation and the TBS index by using a look-up table. This may be workable when the number of parameters for deriving a TBS is not very large. However, it may be more complex and cumbersome to define a TBS table in New Radio (NR) or a newly developed communication system.

In NR, it is more complicated to determine the TBS because of the wide range of supported transmission durations, the wide bandwidth supported in NR, the large number of possible PRBs, the very dynamic available symbol per slot, or the very dynamic reference signal overheads. Accordingly, the TBS design in NR should be more comprehensive and may need to be re-designed. Therefore, it is needed to provide proper TBS determination schemes for NR.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to TBS determination with respect to user equipment and network apparatus in mobile communications.

In one aspect, a method may involve an apparatus determining an intermediate number of information bits. The method may also involve the apparatus quantizing the intermediate number of information bits. The method may further involve the apparatus determining a TBS according to the quantized intermediate number of information bits. The method may further involve the apparatus transmitting, by the processor, the information bits according to the TBS.

In one aspect, an apparatus may comprise a transceiver capable of wirelessly communicating with a plurality of nodes of a wireless network. The apparatus may also comprise a processor communicatively coupled to the transceiver. The processor may be capable of determining an intermediate number of information bits. The processor may also be capable of quantizing the intermediate number of information bits. The processor may further be capable of determining a TBS according to the quantized intermediate number of information bits. The processor may further be capable of transmitting, via the transceiver, the information bits according to the TBS.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to TBS determination with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

Figure 1:
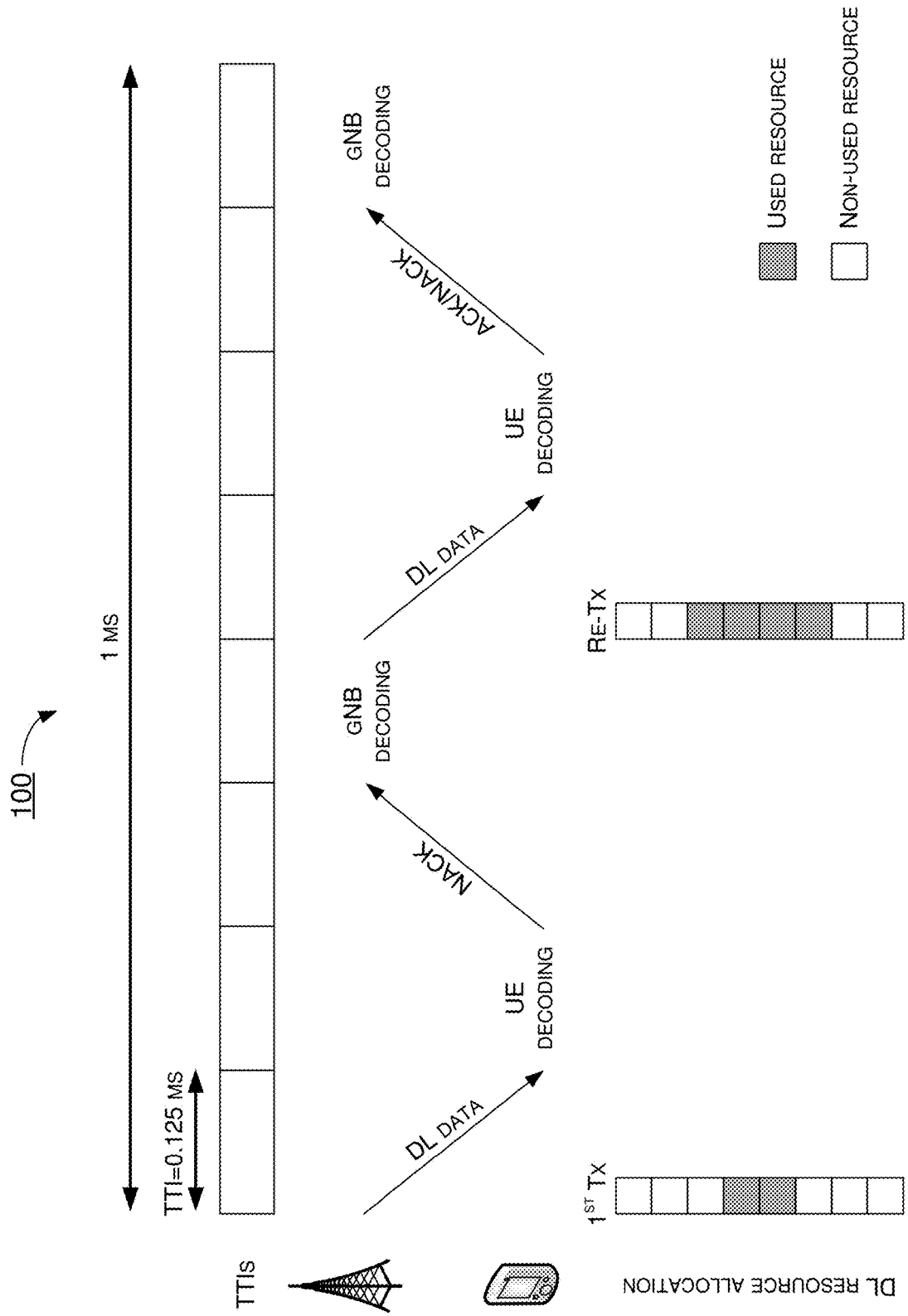
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a UE and a network node, which may be a part of a wireless communication network (e.g., a 5G network, an NR network, an IoT network or an NB-IoT network). In LTE, the TBS is determined based on the PRB allocation and the TBS index by using a look-up table. This may be workable when the number of parameters for deriving a TBS is not very large. However, it may be more complex and cumbersome to define a TBS table in NR or a newly developed communication system. In NR, the TBS determination may need to support large range of PRB allocations, more flexible resource allocations that has to support mini-slots with varying number of allocated symbols, resource sharing with physical downlink control channel (PDCCH), or ultra-reliable and low latency communications (URLLC) asymmetric hybrid automatic repeat request (HARQ) with varying resource allocation. Accordingly, a new design for TBS determination may be needed in NR.

In NR, it is more complicated to determine the TBS because of the wide range of supported transmission durations, the wide bandwidth supported in NR, the large number of possible PRBs, the very dynamic available symbol per slot, or the very dynamic reference signal overheads. Thus, it may be more adequate to use a formula to determine the TBS in NR. Specifically, the UE may be configured to determine the TBS by determining an intermediate number of information bits first. The UE may determine the intermediate number of information bits according to at least one of a scheduled modulation order, a coding rate, a number of resource element, and a signaled number of layers. For example, the intermediate number of information bits may be determined according to the following equation.

$$\beta = Q_m \times R \times N_{REG} \times D_{REperREG} \times N_L$$

$\beta$ denotes the intermediate number of information bits. $Q_m$ denotes the scheduled modulation order. R denotes the coding rate. $N_{REG}$ denotes the number of resource element group (REG) and may be determined from the signaled resource allocation (RA). A REG may correspond to one PRB resource allocation over one symbol. $D_{REperREG}$ denotes the density of RE per REG. $N_L$ denotes the signaled number of layers.

In some implementation, the intermediate number of information bits may also be determined according to the following equation.

$$\beta = N_{RE} \times R \times Q_m \times v$$

$\beta$ denotes the intermediate number of information bits. $N_{RE}$ denotes the number of resource element. R denotes the coding rate. $Q_m$ denotes the scheduled modulation order.

After determining the intermediate number of information bits, the UE may be configured to quantize the intermediate number of information bits. The UE may quantize the intermediate number of information bits by a step size. The step size may be configurable and may comprise a minimum value. The UE may be configured to determine the TBS according to the quantized intermediate number of information bits. The UE may be further configured to transmit the information bits according to the TBS. The UE may determine the TBS according to the following equation.

$$TBS = \delta \times \left\lfloor \frac{Q_m \times R \times N_{REG} \times D_{REperREG} \times N_L - N_{CRC}}{\delta} \right\rfloor$$

$\delta$ denotes the step size. The step size $\delta$ may be adjustable or fixed (e.g., a constant set to 8). $N_{CRC}$ denotes the transport block cycle redundant check (CRC) length.

In a case that the step size is dynamic, it may be determined as a power of 2 (e.g., $\delta=2^n$). The exponent part n may be determined according to a logarithm function of the non-quantized intermediate number of information bits $\beta$ and a configurable offset constant c (e.g., c=6). For example, n may be determined according to the following equation.

$$n = \max(3, \lfloor \log_2(\beta) - d \rfloor)$$

In this example, the step size may comprise a minimum value when n=3 (e.g., $2^3=8$). Hence, the minimum quantization value may be determined as 1 byte.

In some implementation, the step size may be determined according to the CRC length. Specifically, the non-quantized intermediate number of information bits $\beta$ may be determined according to the CRC length (e.g., $\beta = Q_m \times R \times N_{REG} \times D_{REperREG} \times N_L - N_{CRC}$) The exponent part n of the step size may be determined according to a logarithm function of the non-quantized intermediate number of information bits $\beta$ (e.g., $n = \max(3, \lfloor \log_2(\beta) - c \rfloor)$). Thus, the step size may be determined according to the CRC length. For example, n may be determined according to the following equation. The CRC length may be determined as 24. The offset constant may be determined as 5.

$$n = \lfloor \log_2(\beta) \rfloor - 5$$

In some implementation, the UE may be configured to determine the TBS according to at least one of a number of code blocks, a code block size, and a CRC length. For example, the TBS may be determined according to the following equation.

$$TBS = N_{CB} \times CBS - N_{CRC}$$

$N_{CB}$ denotes the number of code blocks. CBS denotes the code block size. $N_{CRC}$ denotes the CRC length.

The number of code blocks may be determined by the following equations.

$$N_{CB}^+ = \left\lceil \frac{\beta}{K_{CB,max}} \right\rceil$$

$$N_{CB}^- = \left\lfloor \frac{\beta}{K_{CB,max}} \right\rfloor$$

$K_{CB,max}$ denotes the maximum code block size (e.g., $K_{CB,max}=3824$ or $K_{CB,max}=8192$).

The code block size may be determined by the following equations.

$$CBS^+ = \delta \times \left\lfloor \frac{\beta}{\delta N_{CB}^+} \right\rfloor$$

$$CBS^- = \delta \times \left\lfloor \frac{\beta}{\delta N_{CB}^-} \right\rfloor$$

In a case that $CBS^- \leq K_{CB,max}$, $N_{CB} = N_{CB}^-$ and $CBS = CBS^-$. In a case that $CBS^- > K_{CB,max}$, $N_{CB} = N_{CB}^+$ and $CBS = CBS^+$. $N_{CB}^-$ and $CBS^-$ may be introduced to consider the round-floor quantization effect and may remove the unwanted boundaries errors. The code block size may be determined according to a byte alignment when $\delta = 8$.

In some implementation, the TBS may be determined according to the following equations.

$$TBS = 8 \times C \times \left\lceil \frac{N'_{info} + 24}{8 \times C} \right\rceil - 24$$

$$C = \left\lceil \frac{N'_{info} + 24}{3816} \right\rceil$$

$N'_{info}$ denotes the quantized intermediate number of information bits. C may correspond to the number of code blocks. 24 may correspond to the CRC length. The other parts may correspond to the code block size.

In some implementation, the UE may be configured to compare the intermediate number of information bits with a threshold value. The threshold value may comprise, for example and without limitation, 3824. The UE may be further configured to determine the TBS according to a comparison result. Specifically, the UE may be configured to determine whether the intermediate number of information bits is greater than the threshold value. In a case that the intermediate number of information bits is not greater than the threshold value, the UE may be configured to determine a first step size for quantizing the intermediate number of information bits. In a case that the intermediate number of information bits is greater than the threshold value, the UE may be configured to determine a second step size for quantizing the intermediate number of information bits. The second step size is different from the first step size. For example, in a case that $\beta \leq 3824$, the UE may determine the exponent part of the first step size by $n = \max(3, \lfloor \log_2(\beta) \rfloor - 6)$. In a case that $\beta > 3824$, the UE may determine the exponent part of the second step size by $n = \lfloor \log_2(\beta) \rfloor - 5$.

Accordingly, the UE configured with the TBS determination schemes in accordance with implementations of the present disclosure may be able to support the requirements in NR such as large range of PRB allocations, more flexible resource allocations that has to support mini-slots with varying number of allocated symbols, resource sharing with PDCCH, or URLLC asymmetric HARQ with varying resource allocation.

Illustrative Implementations

Figure 2:
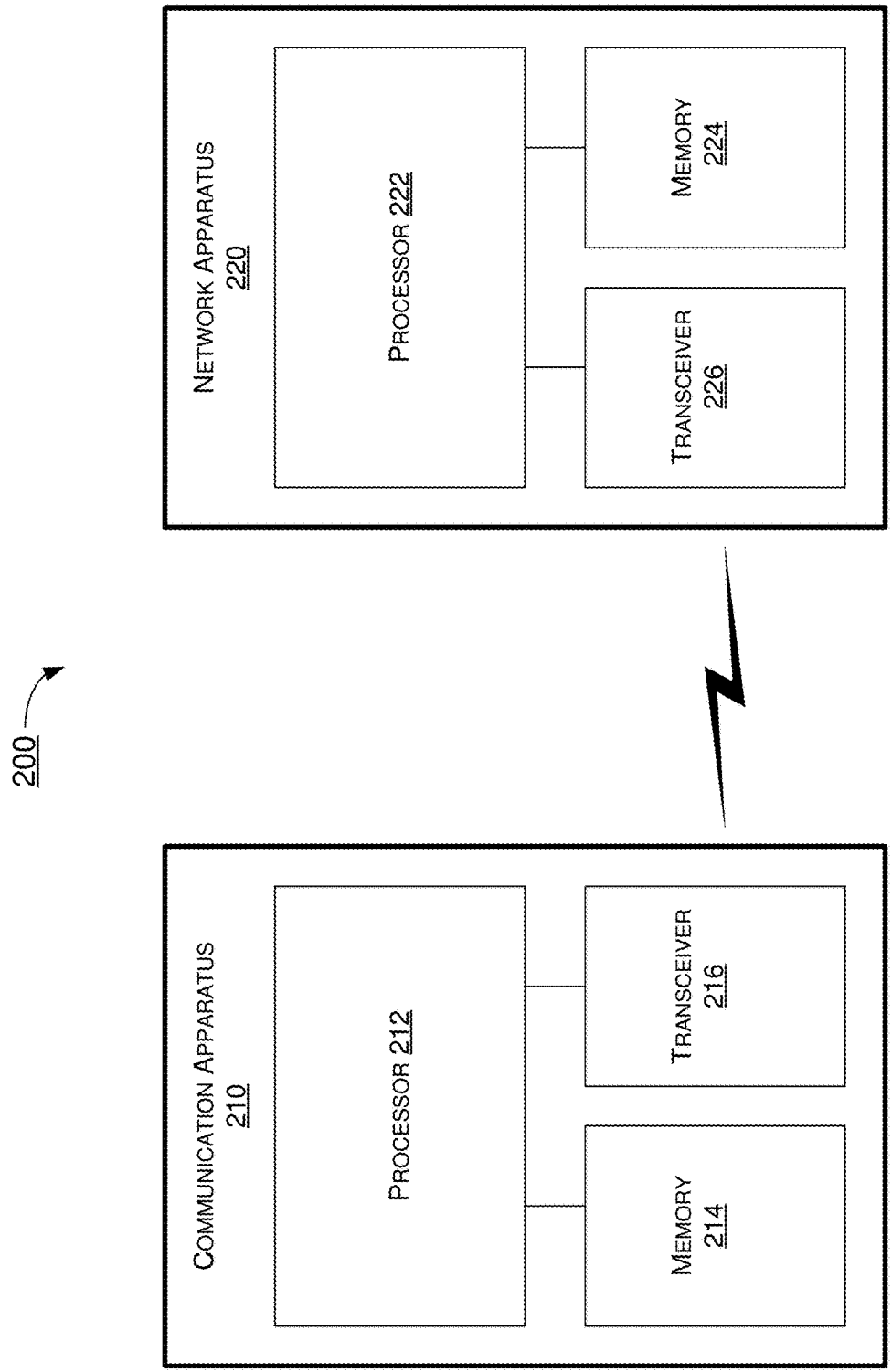
FIG. 2 is a block diagram of an example communication apparatus and an example network apparatus in accordance with an implementation of the present disclosure.

FIG. 2 illustrates an example communication apparatus 210 and an example network apparatus 220 in accordance with an implementation of the present disclosure. Each of communication apparatus 210 and network apparatus 220 may perform various functions to implement schemes, techniques, processes and methods described herein pertaining to TBS determination with respect to user equipment and network apparatus in wireless communications, including scenario 100 described above as well as process 300 described below.

Communication apparatus 210 may be a part of an electronic apparatus, which may be a UE such as a portable or mobile apparatus, a wearable apparatus, a wireless communication apparatus or a computing apparatus. For instance, communication apparatus 210 may be implemented in a smartphone, a smartwatch, a personal digital assistant, a digital camera, or a computing equipment such as a tablet computer, a laptop computer or a notebook computer. Communication apparatus 210 may also be a part of a machine type apparatus, which may be an IoT or NB-IoT apparatus such as an immobile or a stationary apparatus, a home apparatus, a wire communication apparatus or a computing apparatus. For instance, communication apparatus 210 may be implemented in a smart thermostat, a smart fridge, a smart door lock, a wireless speaker or a home control center. Alternatively, communication apparatus 210 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 210 may include at least some of those components shown in FIG. 2 such as a processor 212, for example. communication apparatus 210 may further include one or more other components not pertinent to the proposed scheme of the present disclosure (e.g., internal power supply, display device and/or user interface device), and, thus, such component(s) of communication apparatus 210 are neither shown in FIG. 2 nor described below in the interest of simplicity and brevity.

Network apparatus 220 may be a part of an electronic apparatus, which may be a network node such as a base station, a small cell, a router or a gateway. For instance, network apparatus 220 may be implemented in an eNodeB in an LTE, LTE-Advanced or LTE-Advanced Pro network or in a gNB in a 5G, NR, IoT or NB-IoT network. Alternatively, network apparatus 220 may be implemented in the form of one or more IC chips such as, for example and without limitation, one or more single-core processors, one or more multi-core processors, or one or more RISC or CISC processors. Network apparatus 220 may include at least some of those components shown in FIG. 2 such as a processor 222, for example. Network apparatus 220 may further include one or more other components not pertinent to the proposed scheme of the present disclosure (e.g., internal power supply, display device and/or user interface device), and, thus, such component(s) of network apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including power consumption reduction in a device (e.g., as represented by communication apparatus 210) and a network (e.g., as represented by network apparatus 220) in accordance with various implementations of the present disclosure.

In some implementations, communication apparatus 210 may also include a transceiver 216 coupled to processor 212 and capable of wirelessly transmitting and receiving data. In some implementations, communication apparatus 210 may further include a memory 214 coupled to processor 212 and capable of being accessed by processor 212 and storing data therein. In some implementations, network apparatus 220 may also include a transceiver 226 coupled to processor 222 and capable of wirelessly transmitting and receiving data. In some implementations, network apparatus 220 may further include a memory 224 coupled to processor 222 and capable of being accessed by processor 222 and storing data therein. Accordingly, communication apparatus 210 and network apparatus 220 may wirelessly communicate with each other via transceiver 216 and transceiver 226, respectively. To aid better understanding, the following description of the operations, functionalities and capabilities of each of communication apparatus 210 and network apparatus 220 is provided in the context of a mobile communication environment in which communication apparatus 210 is implemented in or as a communication apparatus or a UE and network apparatus 220 is implemented in or as a network node of a communication network.

In some implementations, processor 212 may be configured to use a formula to determine the TBS in NR. Processor 212 may be configured to determine the TBS by determining an intermediate number of information bits first. Processor 212 may determine the intermediate number of information bits according to at least one of a scheduled modulation order, a coding rate, a number of resource element, and a signaled number of layers.

In some implementations, after determining the intermediate number of information bits, processor 212 may be configured to quantize the intermediate number of information bits. Processor 212 may quantize the intermediate number of information bits by a step size. The step size may be configurable and may comprise a minimum value. Processor 212 may be configured to determine the TBS according to the quantized intermediate number of information bits. Processor 212 may be further configured to transmit, via transceiver 216, the information bits according to the TBS.

In some implementations, in a case that the step size is dynamic, processor 212 may determine the step size as a power of 2 (e.g., $\delta=2^n$). Processor 212 may determine the exponent part n according to a logarithm function of the non-quantized intermediate number of information bits and a configurable offset constant. The step size may comprise a minimum value. Processor 212 may determine a minimum quantization value as 1 byte.

In some implementations, processor 212 may determine the step size according to the CRC length. Specifically, processor 212 may determine the non-quantized intermediate number of information bits according to the CRC length. Processor 212 may determine the exponent part n of the step size according to a logarithm function of the non-quantized intermediate number of information bits. Thus, processor 212 may determine the step size according to the CRC length. For example, processor 212 may determine the CRC length as 24.

In some implementation, processor 212 may be configured to determine the TBS according to at least one of a number of code blocks, a code block size, and a CRC length.

In some implementation, processor 212 may be configured to compare the intermediate number of information bits with a threshold value. Processor 212 may determine the threshold value as, for example and without limitation, 3824. Processor 212 may be further configured to determine the TBS according to a comparison result. Specifically, processor 212 may be configured to determine whether the intermediate number of information bits is greater than the threshold value. In a case that the intermediate number of information bits is not greater than the threshold value, processor 212 may be configured to determine a first step size for quantizing the intermediate number of information bits. In a case that the intermediate number of information bits is greater than the threshold value, processor 212 may be configured to determine a second step size for quantizing the intermediate number of information bits. The second step size is different from the first step size.

Illustrative Processes

Figure 3:
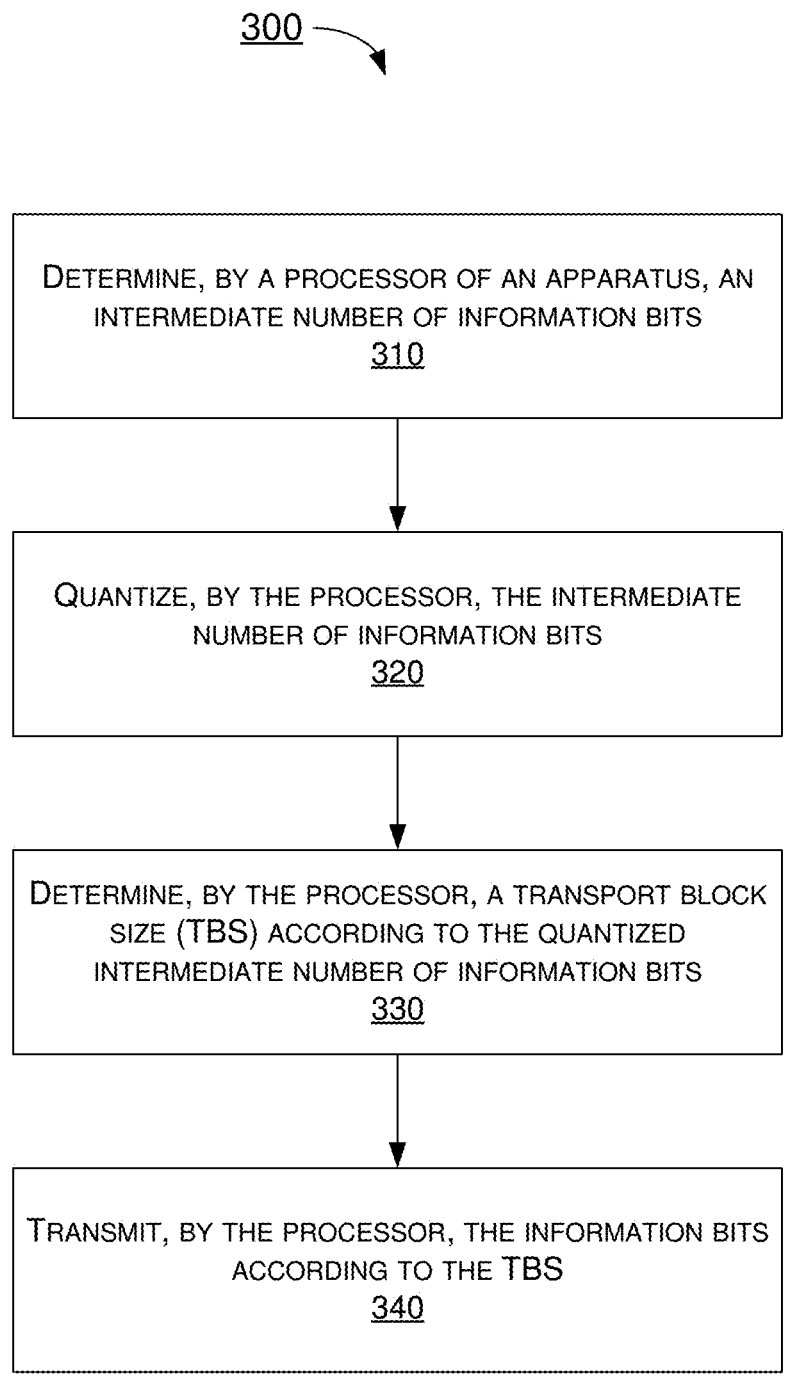
FIG. 3 is a flowchart of an example process in accordance with an implementation of the present disclosure.

FIG. 3 illustrates an example process 300 in accordance with an implementation of the present disclosure. Process 300 may be an example implementation of scenario 100, whether partially or completely, with respect to TBS determination in accordance with the present disclosure. Process 300 may represent an aspect of implementation of features of communication apparatus 210. Process 300 may include one or more operations, actions, or functions as illustrated by one or more of blocks 310, 320, 330 and 340. Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may be implemented by communication apparatus 210 or any suitable UE or machine type devices. Solely for illustrative purposes and without limitation, process 300 is described below in the context of communication apparatus 210. Process 300 may begin at block 310.

At 310, process 300 may involve processor 212 of apparatus 210 determining an intermediate number of information bits. Process 300 may proceed from 310 to 320.

At 320, process 300 may involve processor 212 quantizing the intermediate number of information bits. Process 300 may proceed from 320 to 330.

At 330, process 300 may involve processor 212 determining a TBS according to the quantized intermediate number of information bits. Process 300 may proceed from 330 to 340.

At 340, process 300 may involve processor 212 transmitting the information bits according to the TBS.

In some implementations, process 300 may involve processor 212 quantizing the intermediate number of information bits by a step size. The step size may be configurable and may comprise a minimum value.

In some implementations, process 300 may involve processor 212 determining the step size by a power of 2. The exponent of 2 may be determined according to a logarithm function of the intermediate number of information bits.

In some implementations, process 300 may involve processor 212 determining the exponent according to at least one a cyclic redundancy check (CRC) length and a configurable offset constant.

In some implementations, process 300 may involve processor 212 determining the TBS according to at least one of a number of code blocks, a code block size, and a CRC length.

In some implementations, process 300 may involve processor 212 determining the code block size according to a byte alignment.

In some implementations, process 300 may involve processor 212 determining the intermediate number of information bits according to at least one of a number of resource element, a coding rate, a scheduled modulation order, and a signaled number of layers.

In some implementations, process 300 may involve processor 212 comparing the intermediate number of information bits with a threshold value. Process 300 may further involve processor 212 determining the TBS according to a comparison result.

In some implementations, process 300 may involve processor 212 determining whether the intermediate number of information bits is greater than a threshold value. Process 300 may further involve processor 212 determining a first step size for quantizing the intermediate number of information bits when the intermediate number of information bits is not greater than the threshold value.

In some implementations, process 300 may involve processor 212 determining whether the intermediate number of information bits is greater than a threshold value. Process 300 may further involve processor 212 determining a second step size for quantizing the intermediate number of information bits when the intermediate number of information bits is greater than the threshold value.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

determining, by a processor of an apparatus, an intermediate number of information bits;

quantizing, by the processor, the intermediate number of information bits;

determining, by the processor, a transport block size (TBS) according to the quantized intermediate number of information bits;

transmitting, by the processor, the information bits according to the TBS; and determining, by the processor, a step size by a power of 2, wherein the intermediate number is proportional to a modulation order and a coding rate, wherein the information bits comprise data bits, control bits, or a combination thereof, wherein the quantizing comprises quantizing the intermediate number of information bits by the step size,
wherein the step size is configurable and comprises a minimum value, and
wherein an exponent of 2 is determined according to a logarithm function of the intermediate number of information bits.

2. The method of claim 1, further comprising:
determining, by the processor, the exponent according to at least one a cyclic redundancy check (CRC) length and a configurable offset constant.

3. The method of claim 1, further comprising:
determining, by the processor, the TBS according to at least one of a number of code blocks, a code block size, and a cyclic redundancy check (CRC) length.

4. The method of claim 1, further comprising:
determining, by the processor, the code block size based on the step size being one byte.

5. The method of claim 1, further comprising:
determining, by the processor, the intermediate number of information bits according to at least one of a number of resource element, a coding rate, a scheduled modulation order, and a signaled number of layers.

6. The method of claim 1, further comprising:
comparing, by the processor, the intermediate number of information bits with a threshold value; and
determining, by the processor, the TBS according to a comparison result.

7. The method of claim 1, further comprising:
determining, by the processor, whether the intermediate number of information bits is greater than a threshold value; and
determining, by the processor, a first step size for quantizing the intermediate number of information bits when the intermediate number of information bits is not greater than the threshold value.

8. The method of claim 1, further comprising:
determining, by the processor, whether the intermediate number of information bits is greater than a threshold value; and
determining, by the processor, a second step size for quantizing the intermediate number of information bits when the intermediate number of information bits is greater than the threshold value.

9. An apparatus, comprising:
a transceiver capable of wirelessly communicating with a plurality of nodes of a wireless network; and
a processor communicatively coupled to the transceiver, the processor capable of:
 determining an intermediate number of information bits;
 quantizing the intermediate number of information bits;
 determining a transport block size (TBS) according to the quantized intermediate number of information bits;
 transmitting, via the transceiver, the information bits according to the TBS;
 determining a step size by a power of 2,
wherein the intermediate number is proportional to a modulation order and a coding rate,
wherein the information bits comprise data bits, control bits, or a combination thereof,
wherein the quantizing comprises quantizing the intermediate number of information bits by the step size,
wherein the step size is configurable and comprises a minimum value, and
wherein an exponent of 2 is determined according to a logarithm function of the intermediate number of information bits.

10. The apparatus of claim 9, wherein the processor is further capable of:
determining the exponent according to at least one a cyclic redundancy check (CRC) length and a configurable offset constant.

11. The apparatus of claim 9, wherein the processor is further capable of:
determining the TBS according to at least one of a number of code blocks, a code block size, and a cyclic redundancy check (CRC) length.

12. The apparatus of claim 9, wherein the processor is further capable of:
determining the code block size based on the step size being one byte.

13. The apparatus of claim 9, wherein the processor is further capable of:
determining the intermediate number of information bits according to at least one of a number of resource element, a coding rate, a scheduled modulation order, and a signaled number of layers.

14. The apparatus of claim 9, wherein the processor is further capable of:
comparing the intermediate number of information bits with a threshold value; and
determining the TBS according to a comparison result.

15. The apparatus of claim 9, wherein the processor is further capable of:
determining whether the intermediate number of information bits is greater than a threshold value; and
determining a first step size for quantizing the intermediate number of information bits when the intermediate number of information bits is not greater than the threshold value.

16. The apparatus of claim 9, wherein the processor is further capable of:
determining whether the intermediate number of information bits is greater than a threshold value; and
determining a second step size for quantizing the intermediate number of information bits when the intermediate number of information bits is greater than the threshold value.

* * * * *